June 27, 1967  J. E. FOARD ET AL  3,328,016

TUYERE PUNCHING MACHINE

Filed June 29, 1965　　11 Sheets-Sheet 3

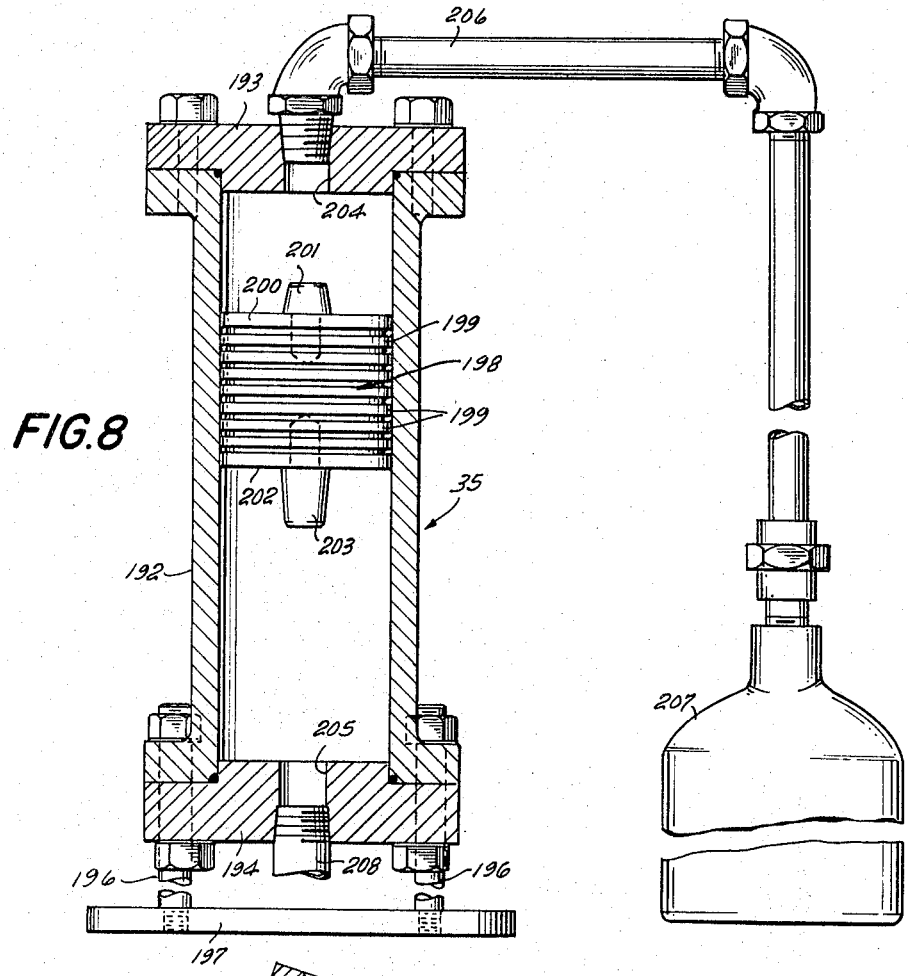
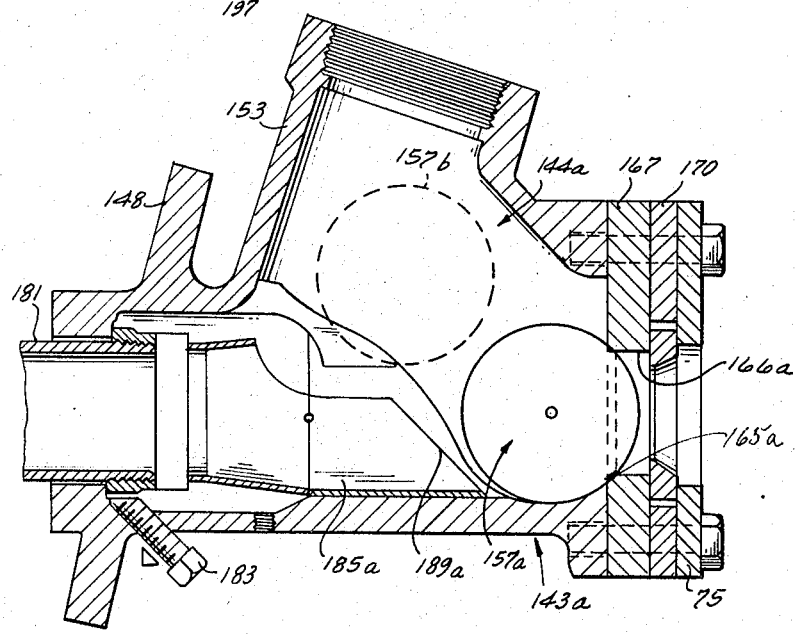

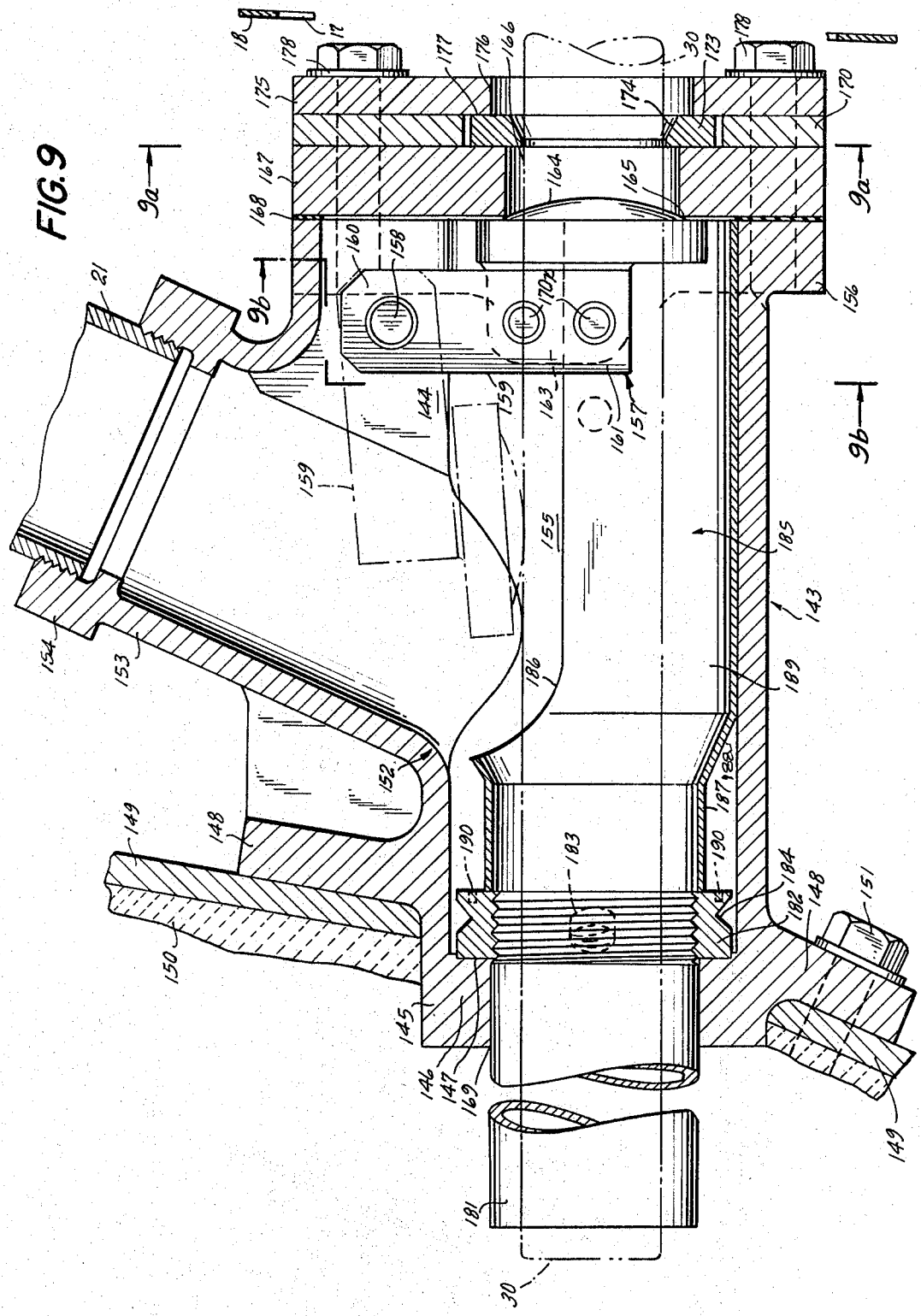

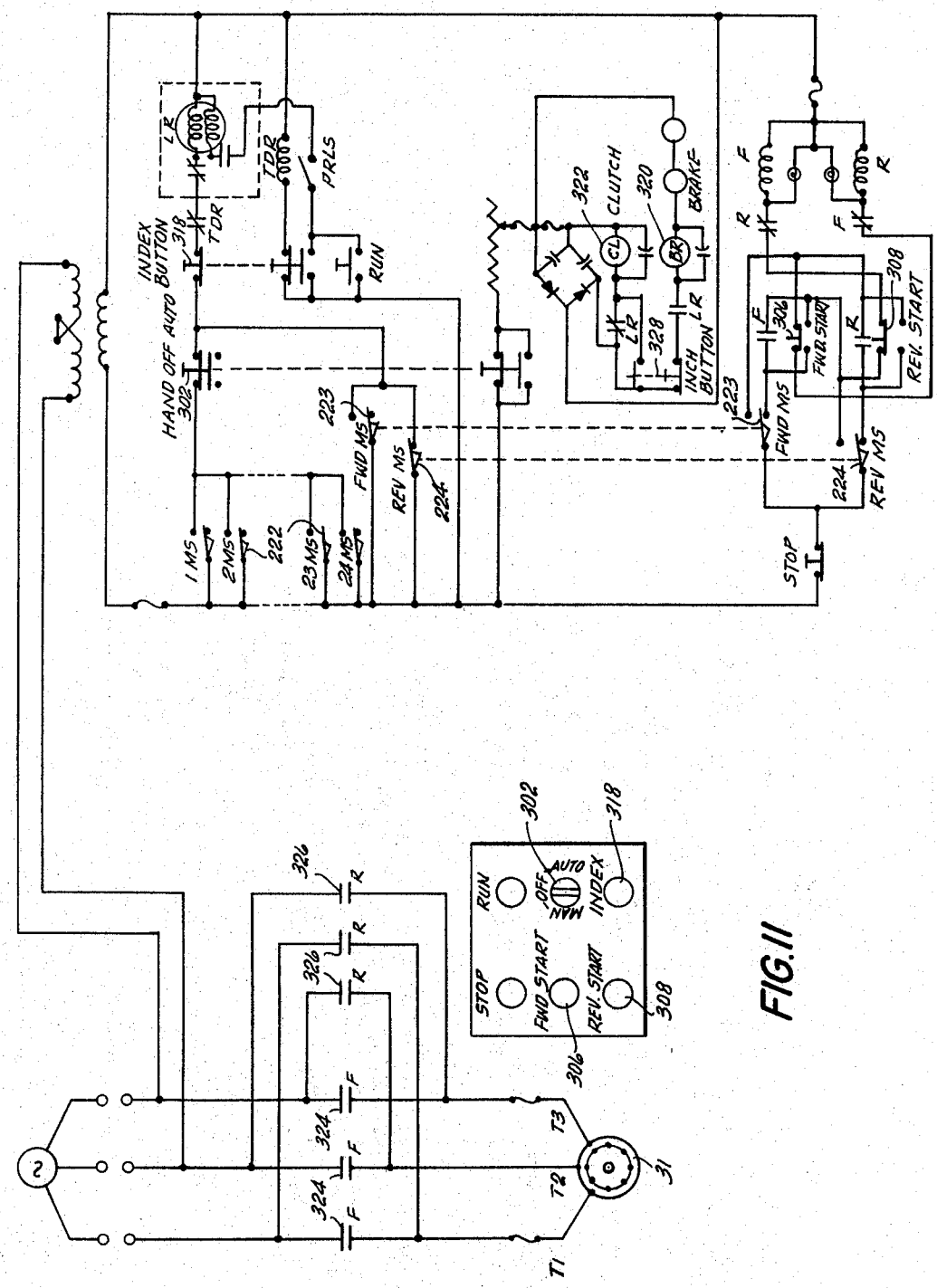

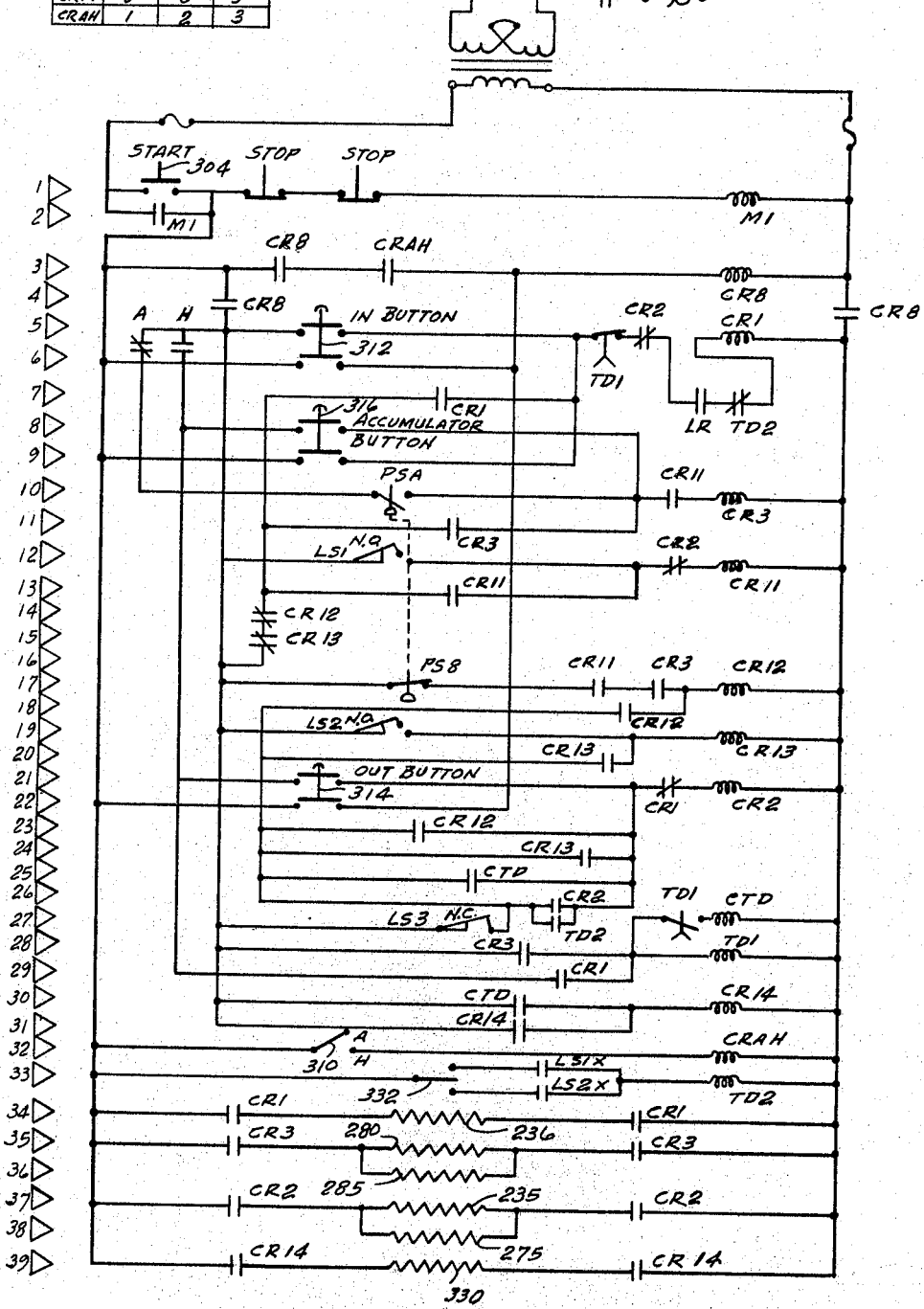

United States Patent Office 3,328,016
Patented June 27, 1967

3,328,016
TUYERE PUNCHING MACHINE
James Edwin Foard, Fred Marsh Winkler, and Floyd Hoffman, Morenci, Ariz., and Maurice Mortimer Clemons, Franklin, Mich., assignors to Phelps Dodge Corporation, New York, N.Y., a corporation of New York
Filed June 29, 1965, Ser. No. 467,884
18 Claims. (Cl. 266—36)

This invention relates to the removal of accretions from the tuyeres of converters such as the converters which are used for blowing copper matte and the like and more particularly to a power driven machine for punching the tuyeres.

Generally speaking, copper converting comprises blowing with air a quantity of molten matte (essentially a mixture of ferrous and cuprous sulfides) within a refractory-lined vessel called a "converter," the purpose being to render the iron as an oxide for removal as an iron silicate slag, and to oxidize the sulfur of the cuprous sulfide for the production of copper. Certain variations of the process may be achieved by making appropriate adjustments in the amount of air introduced, or the quantity of flux added, or both. The most commonly used vessel is of cylindrical shape and mounted to be rotated about its horizontally disposed central axis. It is equipped with a row of horizontally disposed tuyeres which are mounted in the cylindrical wall. These tuyeres provide openings through the shell and lining and are connected to an outside source of compressed air. During the blowing of air through the tuyeres into the body of molten material in the converter to carry out the converter operation, accretions or encrustations form at the inner extremity of the tuyere pipe. These have to be removed to provide passageway for the air that is being blown through the tuyeres into the molten matte.

Conventional tuyeres are normally arranged in a line and may be mounted at approximately six inch centers, although the number and distance apart of the tuyeres may be different on different converters. As a typical example of known practice, the tuyeres may consist of lengths of 1½" or 2" pipe inserted through holes in the shell and bricked into the refractory lining. The exterior of each tuyere pipe is joined to its own tuyere body, which is rigidly secured to the outside of the converter shell and connected by a downcomer conduit to a bustle pipe through which compressed air is introduced. In addition to serving as a transition piece between the tuyere and bustle pipe, a tuyere body serves as access means to the tuyere so that accretions, which form at the inner extremity during the converting process, may be removed. The tuyere body is provided with a suitable check valve, so that air is normally directed into the converter and not through the external opening to the atmosphere.

Converter tuyeres may be cleaned either manually or mechanically; this cleaning operation being more commonly called tuyere punching. In the manual method, a rod having a head is thrust through the external tuyere body into the tuyere pipe at the same time unseating the check valve which disadvantageously causes a large part of the compressed air to escape to the atmosphere. By the manual punching method, accretions are removed to keep the passageway open for air through the tuyere into the molten charge in the converter.

Mechanical punching devices have heretofore been suggested and patented. The prior art devices have utilized mechanical means, such as a pneumatic device positioned at each tuyere location acting through small air cylinders provided with pistons and suitable exhaust ports. This apparatus imparts a forward and backward stroke to a short length of punch rod, simulating the principle of manual punching, but the insertion and retraction strokes are rendered at much higher velocities. Also there are prior art constructions in which a large and cumbersome frame work is attached to the converter or mounted independently, upon which is mounted a movable carriage, carrying a punch rod driven by a fluid operated cylinder which is mounted on the carriage. Those devices in one way or another have drawbacks. Among other things, some do not make adequate provisions for punching the tuyeres with a sufficient force for effective tuyere cleaning or with a force that can adequately be adjusted for the differences in the resistance to removal of the accretions at various tuyeres during a punching cycle of successive tuyeres, or adequate provision for avoiding undue strain upon the apparatus during the punching of a tuyere which is plugged with an accretion or incrustation that unduly resists removal from the tuyere, or adequate provision for ready adjustment of the length of the stroke of the punch rod for varying conditions of the converter lining, or are so intricate or cumbersome as to present problems of operation and maintenance which render them commercially unfeasible.

The apparatus provided by this invention overcomes the drawback of prior devices. It comprises a fixed platform mounted independently of the converter on which is mounted a track providing a guideway along the row of tuyeres of the converter; a power driven carriage movable along said track comprising a table on which is adjustably mounted a hydraulic cylinder whose piston rod carries a punch rod which is reciprocable for punching a selected tuyere, the punch rod being retractable after a punching operation so that the carriage may be automatically moved along said track to positions for selectively punching the tuyeres in a row of tuyeres, an hydraulic system operative automatically to operate the hydraulic cylinder, means for controlling depth of penetration of the punch ram and at different selected pressures to vary the punching force of the punch rod in accordance with conditions of the accretions encountered during a tuyere punching operation and means operative to protect the apparatus from undue stresses when usually resistant accretions are encountered by the punch rod, tuyere means designed to cooperate with the punch rod to avoid unwanted withdrawal of accretions outwardly into the tuyere on the return stroke of the punch rod and to avoid escape of pressurized air in the tuyere body during a tuyere punching cycle, the various mechanisms being electrically and adjustably indexed and controlled for automatic power driven converter punching.

Although the novel features which are believed to be characteristic of the invention are pointed out in the annexed claims, the invention itself, as to its objects and advantages, and the manner in which it may be carried out may be better understood from the more detailed description which follows, taken in connection with the accompanying drawings forming a part hereof, in which:

FIG. 8 is a view in elevation and partly in section to illustrate the pressure accumulator of the hydraulic fluid system;

FIG. 9 is a view in section partly broken away on line 9—9 of FIG. 1 showing details of a typical tuyere, to illustrate its cooperation with the puncher;

FIG. 9c is a view in section and partly broken away of a modified form of tuyere;

FIG. 11 is a wiring diagram to illustrate the electrical hook-up for the puncher carriage;

FIG. 12 is a wiring diagram to illustrate the electrical hook-up for the puncher; and FIG. 12a is a diagram to illustrate the nature of the contact relays employed in the wiring diagram of FIG. 12.

Figure 1:
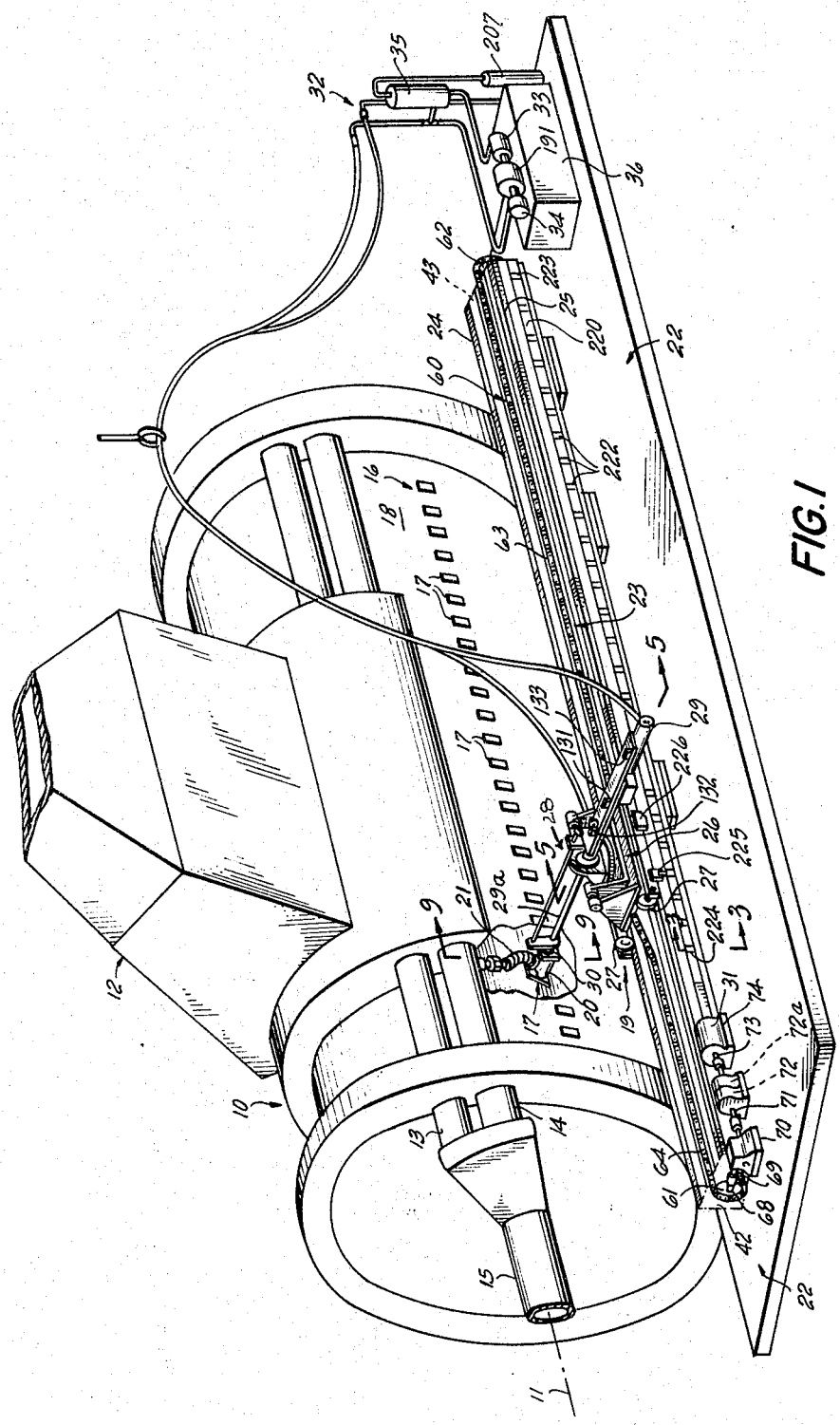
FIG. 1 is a perspective view showing in a general way a copper converter and the arrangement of the tuyeres, carriage platform and power driven travelling puncher carriage movable on a track supported on the platform, the hydraulic cylinder and punch rod adjustably mounted on the carriage table and the general arrangement of the hydraulic pressure system embodying the invention.

Referring now to the drawings in which like reference characters indicate like parts throughout the several views, the general arrangement is shown in FIG. 1. The copper converter 10 is mounted for rotation about its horizontal axis 11 in a manner known in the art. It is provided with a conventional hood 12, bustle pipes 13, 14, connected through a swivel connection to swing around the fixed horizontal air supply pipe 15.

A horizontally disposed row 16 of tuyeres 17 is provided in the cylindrical side wall 18 of the converter. In this instance there are twenty-four tuyeres. Each tuyere 17 comprises a body 20 which is connected by a downcomer conduit 21 connected to bustle pipe 14. The details of a typical tuyere is described in further detail hereinafter.

The converter platform 22 serves as a base upon which to mount the carriage platform 23. The carriage platform comprises a structure which supports a pair of parallel tracks 24, 25 mounted in parallel relation with the horizontal row 16 of tuyeres 17. Mounted on table 26 of the travelling carriage 19 are a set of four rotatable wheel rollers 27, one at each corner of the carriage. The table 26 serves as a base upon which is mounted the puncher 28 comprising hydraulic cylinder 29 and reciprocable piston rod 29a which is connected to a punch rod 30, sometimes herein referred to as a ram. The details of the construction of the puncher 28 are described hereinafter. Suffice it to say at this point that the puncher is contrived to cause the punch rod to enter the tuyere bodies selectively and to punch a selected tuyere and when the tuyere punching cycle is completed, the punch rod is withdrawn, after which the puncher carriage 19 may be moved by means of a motor 31 along the tracks 24, 25 to another selected tuyere for punching that tuyere, and the cycle repeated for all tuyeres in row 16.

The hydraulic system, designated generally by reference character 32, comprises a reservoir 36 for hydraulic fluid, a large pump 33 which provides a primary source of pressurized hydraulic fluid and a smaller pump 34 connected in a suitable hydraulic circuit 32 with a pressure accumulator 35 which provides an auxiliary or secondary source of pressurized hydraulic fluid under a pressure substantially greater than said primary source; the hydraulic circuit being connected to operate the hydraulic cylinder in various ways as described in further detail hereinafter.

Figure 5:
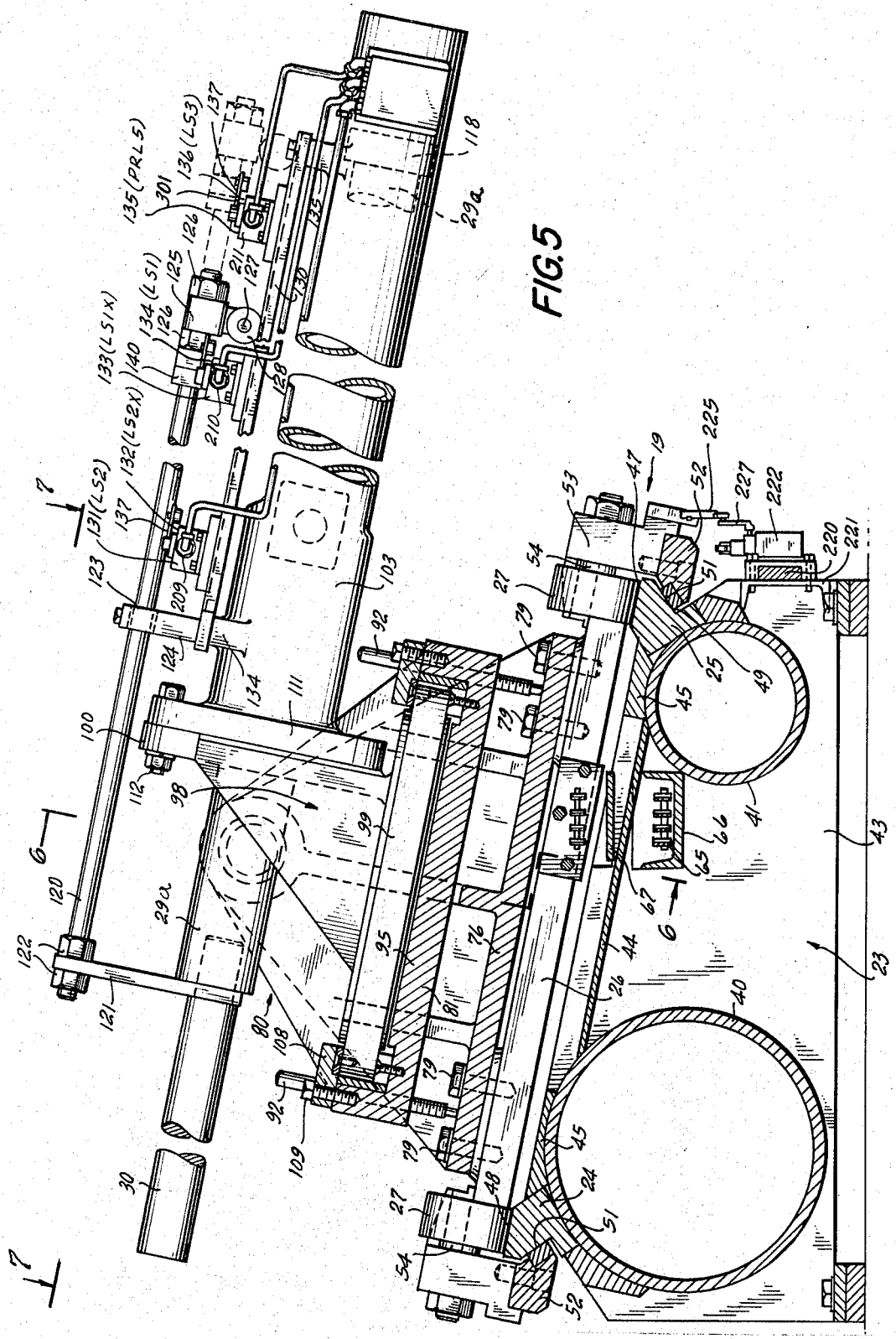
FIG. 5 is a view in elevation, partly in section and partly broken away on 5—5 of FIG. 1.
Figure 6:
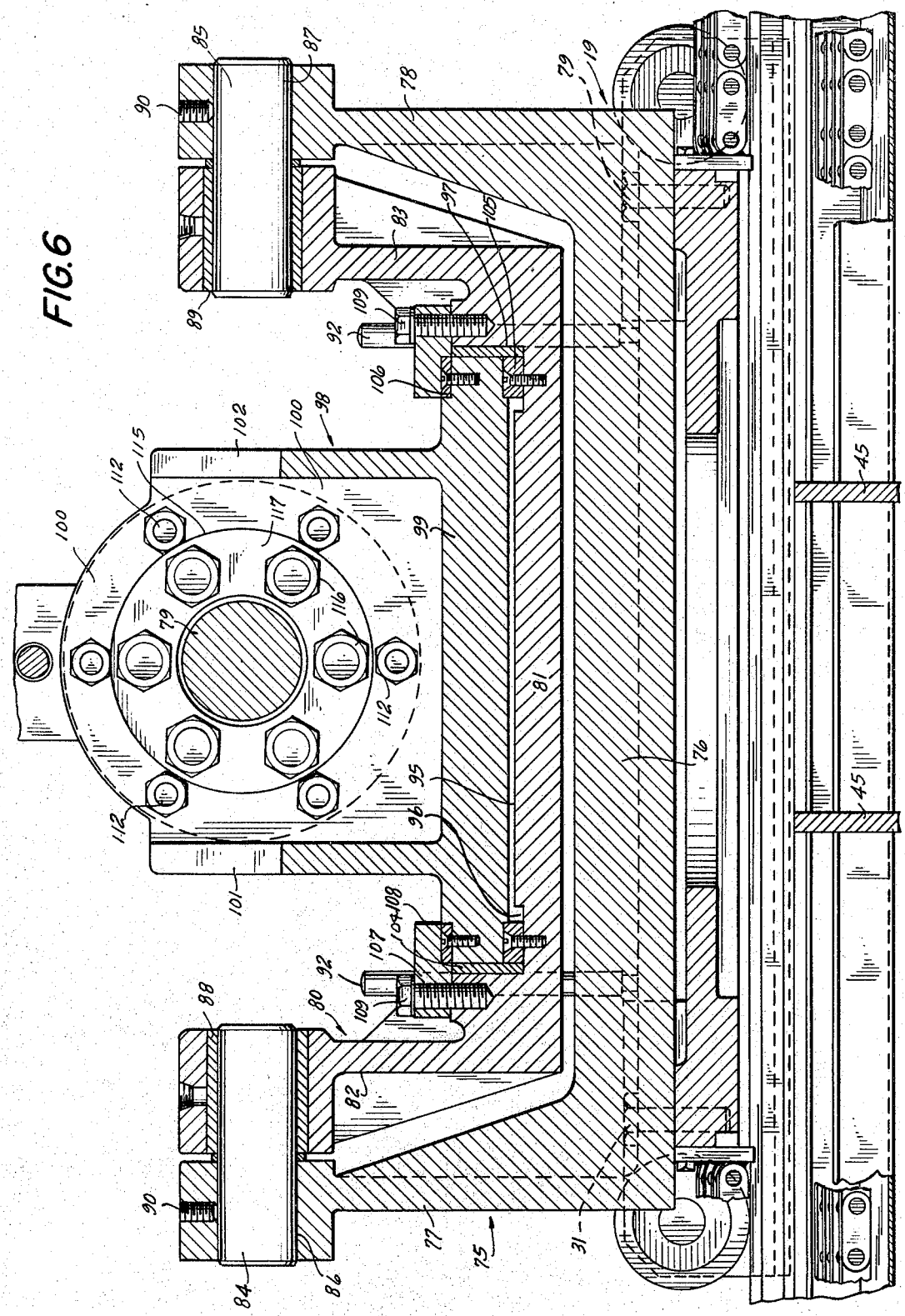
FIG. 6 is a view in section on line 6—6 of FIG. 5.
Figure 7:
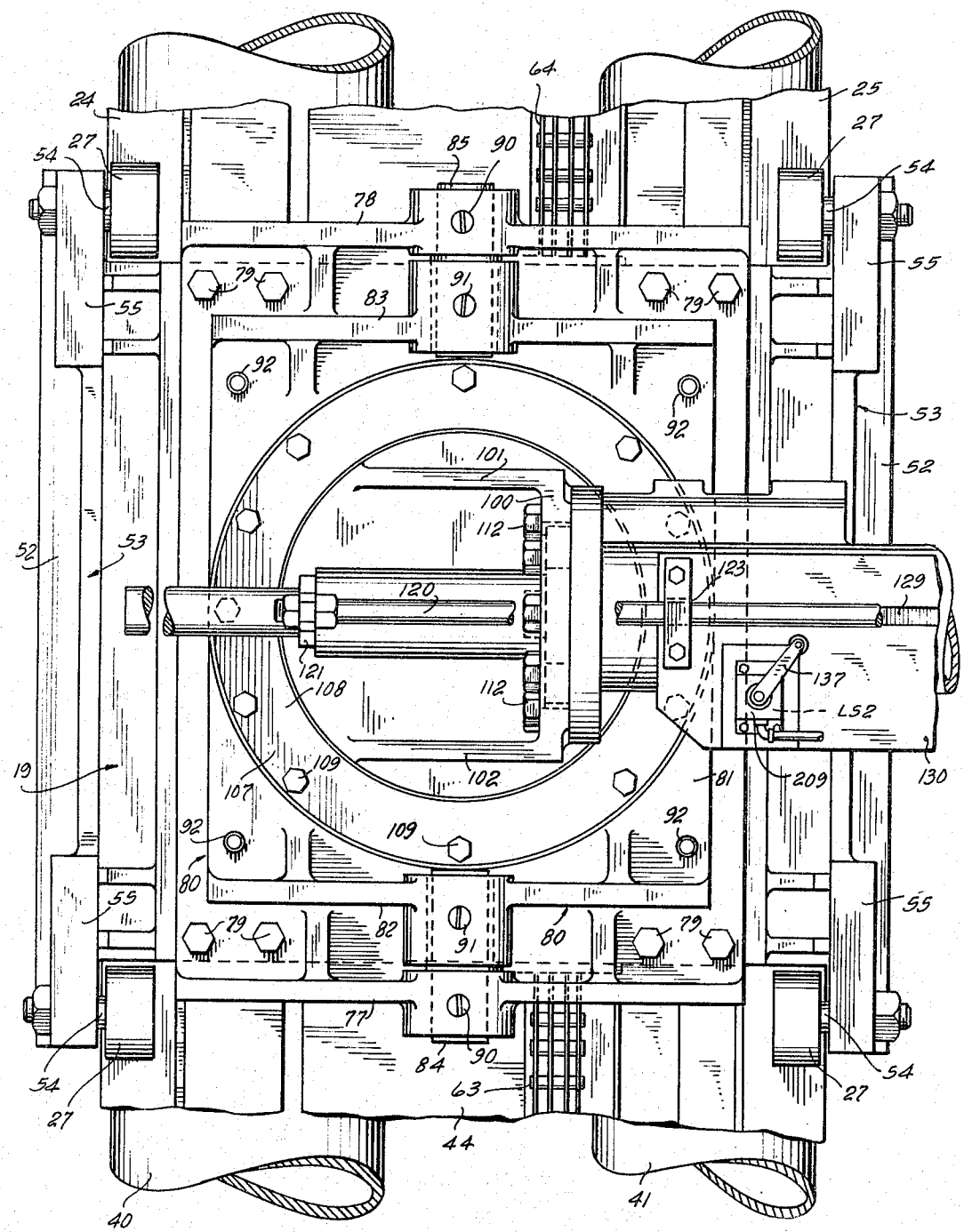
FIG. 7 is a partial plan view of FIG. 5 looking in the direction of arrows 7—7 of FIG. 5.

Reference is now made more particularly to FIGS. 5, 6 and 7 wherein are shown further details of the construction of the puncher including the carriage and the carriage platform. The carriage platform structure 23, comprises a pair of tubular structural members 40, 41 serving as main sills running the full length of the carriage platform and secured at their respective ends to vertical end plates 42, 43, these tubular main sills being tied together by cross plate 44. Gussets 45 positioned at intervals along the main sills further strengthen the carriage platform structure. Mounted longitudinally along the small or tubular main sill 41 and secured thereto is a wheel track 25 having a tread surface 47. A similar and parallel track 24 having a tread surface 48, is mounted on the large tubular main sill 40. Track 25 has an inwardly and downwardly inclined surface 49 along its length which serves as a surface against which a hold-down shoe 51 of suitable material is slidably mounted, this shoe being mounted on a bar 52 secured to a frame saddle member 53 which is fastened to the carriage frame. Stub shafts 54 extending through standards 55 of the frame saddle member serve for rotatably mounting the rollers 27. The construction of frame saddles and shoes is the same on the opposite sides of the puncher carriage. The hold-down bars 52 serve to hold the carriage on its tracks and prevent unwanted tipping of the carriage.

The means, as shown, for moving the carriage 19 along the tracks 24, 25 comprise a sprocket chain 60 (see FIG. 1) trained over a driven sprocket 61 mounted for rotation at one end of carriage platform 23 and an idler sprocket 62 mounted for rotation at the other end of this platform. The chain at one end is secured to the carriage table 26 and at the other end to the opposite side of the carriage table; the upper runs 63, 64 of the sprocket chain running on a plate 67 on the upper surface of the carriage platform and the lower run 65 (see FIG. 5), running in a channel track 66 mounted under the cross plate 44.

The driven sprocket 61 is mounted on a shaft 68, coupled to the shaft 69 of a speed reducer 70, the other shaft of which is coupled to the shaft 71 of a brake 72 and clutch 72a, the other shaft of which is coupled to the driven shaft 73 of a reversible electric motor 31. The speed reducer 70, clutch brake 72, 72a, and motor 31 may be mounted on the converter platform 22 as shown in FIG. 1. Other suitable means may be provided for moving the carriage such as motor driven rotatable screw meshing with a worm pinion gear mounted on the carriage, instead of the chain and sprockets.

Means for mounting the hydraulic cylinder on the carriage (see FIGS 5, 6, 7) comprise a trunnion support member 75 having a base 76 from which upwardly extend a pair of trunnion supporting legs or standards 77, 78, one on each side of the base 76. The base of the trunnion support is secured to carriage table 26 by stud bolts 79. A trunnion cradle 80 having a base 81, and upstanding arms 82, 83, is mounted on the trunnion support 75 by means of trunnion pins 84, 85 mounted in apertures 86, 87 in standards 77, 78 and journal bearings 88, 89 in the trunnion cradle arms; the pins being locked in place by set screws 90, and apertures 91 are provided for oiling the bearings. The trunnion cradle 80 is mounted for swingable movement on trunnion pins 84, 85 within limits, provided by stops which comprise vertically adjustable screw pins 92 extending through trunnion cradle support base 81 at each corner thereof and engaging the base 76 of the trunnion support 75.

The cradle base 81 is provided with a circular bed 95 having a peripheral groove 96 and cylindrical side wall 97 thus providing a cylindrical well in which is mounted a swivel support 98 having a circular base 99 and an upstanding mounting plate 100, reinforced by wings 101, 102, upon which is mounted the hydraulic cylinder 103 of the puncher 29. The circular base 99 of the swivel support 98, is mounted in the well which is provided with a bushing ring 104. A flat annular shim ring 105 is mounted in the groove 96 and a flat shim ring 106 is mounted in an annular offset at the periphery of the circular base 99 of the swivel support. A clamping ring 107 having an inwardly extending annular shoulder 108 engaging the shim ring 106 is secured by bolts 109 to the base 81 of the trunnion cradle 80 and this arrangement provides means for angular adjustment of the swivel support about its vertical axis and hence permits angular adjustment of the hydraulic cylinder 103 and the punch rod 30 in relation to the long axes of the tuyeres 17. Limited angular adjustment of the hydraulic cylinder and punch rod about the axes of the trunnion pins 84, 85 is provided by the threaded vertical adjusting pins 92.

The cylinder 103 has an outwardly extending annular flange 111 at its inner end which engages and is secured to the mounting plate 100 by means of bolts 112. The mounting plate 100 is provided with a central opening 115 which allows reciprocation therethrough of the piston rod 29 and also provides access to the bolts 116, of a packing gland 117 in the forward head of the hydraulic cylinder 103.

The hydraulic cylinder has a reciprocating piston 118 and rod 29a shown conventionally in dotted lines in FIG. 5. The outer end of the piston rod is removably connected to the punch rod 30. Hence, when the hydraulic cylinder is operated by fluid pressure, as described in further detail hereinafter, the punch rod may be forced in a forward stroke into a tuyere body and into the tuyere pipe for punching the tuyere and retracted in a rearward stroke out of the tuyere to normal position free from the tuyere body, so that the puncher carriage may be moved on its track to a position opposite another selected tuyere to be punched.

The cylinder is provided with a stroke control rod 120, limit switches and other mechanisms contrived for controlling the operation of the hydraulic cylinder and hence the punch rod 30. The control rod 120 is connected to the forward end of the piston rod 29a by means of a supporting arm 121 secured at its lower end to the piston rod and at its upper end to the forward end of the control rod and clamped thereto by screw nuts 122. The control rod 120 is mounted to slide along the length of the cylinder in a bearing 123 mounted in the upper end of a bearing standard 124 supported on and extending upwardly at the forward end of cylinder 103. The rear end of the control rod is secured to a support member 125 adjustably mounted on the control rod by screw units 126. The support member 125 has an axle 127 on which a support roller 128 is rotatably mounted; the roller travelling upon a track 129 on a plate 130 which also serves as a base upon which six limit switches, LS3(136), PRLS(135), LS1(134), LS1X(133), LS2X(132) and LS2(131), are mounted at intervals along the length of the cylinder 103. These switches may be appropriately mounted in suitable switch housings, such as switch housings 209, 210, 211. And each of the switches PRLS, LS3, LS1, LS1X, LS2X and LS2 have a trip lever like trip lever 137 and each trip lever is actuated by a trip dog 140, adjustably secured to the rear end portion of the control rod 120, as the piston rod 29a moves forward in a punching stroke and upon the return stroke of the piston rod. The purpose and operation of the limit switches are described in further detail hereinafter in connection with the operation of the puncher.

Figure 9A:
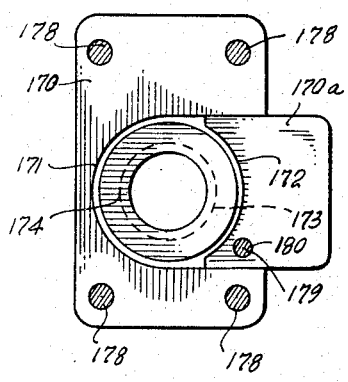
FIG. 9a is a view of line 9a—9a of FIG. 9.
Figure 9B:
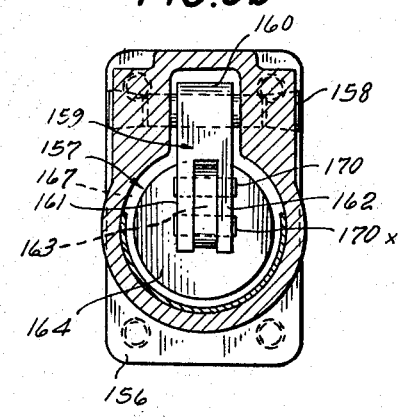
FIG. 9b is a view of line 9b—9b of FIG. 9.

Further details of a typical tuyere 17 which is contrived to cooperate with the tuyere punch 30 are shown in FIGS. 9, 9a and 9b. It comprises a hollow cast steel body 143. The inner end of the body has a cylindrically shaped nose portion 145 having an inwardly extending annular flange 146 providing an annular shoulder 147. A mounting flange 148 extends outwardly from the cylindrical wall of the nose portion at such an angle as to engage the steel shell 149 of the cylindrical converter wall. When the tuyere body is mounted, the nose portion extends through a hole in the converter shell and the flange is secured to the shell 149 by fastening means such as bolts 151. Extending upwardly from the central body portion 152 is a hollow leg portion 153 provided with a threaded upper end 154 to which the downcomer 21 is connected; thus passageway is provided for compressed air from bustle pipe 14 into the interior cavity 155 of the body. The outer end of the tuyere body has a rectangularly shaped flange 156 which provides an opening which is generally circular at its bottom portion and rectangular in shape at its upper end, thus providing an interior space 144 in which a flap valve 157 is pivotally mounted on a pivot pin 158 extending through the sidewalls of the outer end portion of the tuyere body. The flap valve (see FIGS. 9 and 9b) comprises a bifurcated lever 159 having an upper end portion 160 through which the pivot pin 158 extends and clevis arms 161, 162 (see FIG. 9b) at its lower end. The clevis arms fit over a boss 163 extending outwardly from the rear side of a circular valve, the face 164 of which has a convex surface and in normal position seats at its periphery on a circular seat 165 on a bore 166 in flange 167 which engages the flange 156 at the outer end of the main body portion of the tuyere body; a gasket 168 being used to insure a good seal. Pins 170X extending through bores in the clevis arms 161, 162 and registering bores in the boss 163 secure the circular valve to the lever 159. The bore 166 is in axial alignment with the central opening 169 of the nose portion 145. The valve 151 may swing on pivot 158 to the position shown in dot-dash lines in FIG. 9 to open the port provided by bore 166 in the valve-seat flange 167.

A two part plate 170, 170a, which serves as a retainer for a seal ring, is mounted in engagement with the valve-seat flange 167. Plate 170 is cut out at 171 and plate 170a is cut out at 172 (see FIG. 9a) to provide a circular opening in which is inserted a floating seal ring 173. The seal ring has a central opening 174 which flares outwardly. The opening in the seal ring is of a size which has a diameter only slightly greater than the diameter of the punch rod 30, so that when the punch rod enters and passes through the retainer ring, there is the smallest possible annular space between the interior of the seal ring and the outer surface of the punch rod to prevent the escape of compressed air from the interior of the tuyere body to the outside atmosphere. The punch rod 30 is of uniform diameter throughout its length. The seal ring is maintained in its floating position in the retainer plate by a ring cover plate 175 having a central opening 176 of a size to provide an annular shoulder 177 covering the outside peripheral portion of the seal ring and sufficiently large to allow the punch rod 30 to pass through without interference. The cover plate 175, retainer plate 170, and valve seat flange 167 are secured to the body flange 156 by stud bolts 178 which are readily accessible for removal to afford access to the interior space 155 of the tuyere body for replacement of the tuyere pipe, as described later. The retainer plate 170a is retained in the position shown in FIG. 9a by means of a set screw 179 extending through a bore in cover plate 175 registering with a bore 180 in the retainer plate. The flared seal ring is mounted to float in the retainer plate opening so that the ring will center itself readily about the punch rod should the latter enter the tuyere body in a direction which might not be in exact axial alignment with the axis of the tuyere body.

Figure 2:
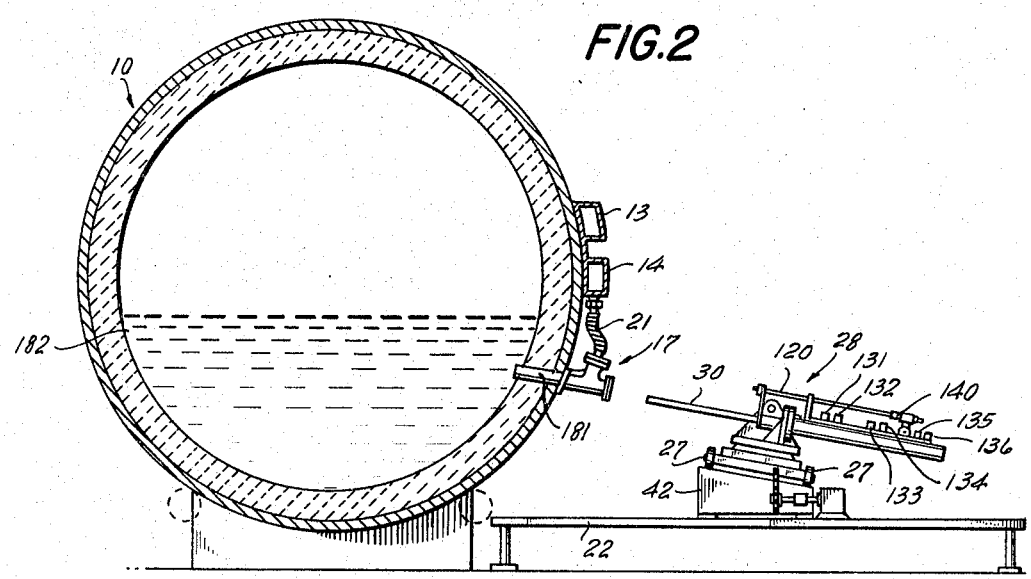
FIG. 2 is a view in elevation and partly in section, and somewhat diagrammatic, showing a side view of the puncher and illustrating its relation to a typical tuyere.

The tuyere pipe 181 (see FIG. 9) is a pipe nipple of suitable length to extend through the refractory lining and into the molten charge 182 in the converter (see FIGS. 2 and 9); and of suitable diameter to slidably fit into the opening 169. It is threaded at its rear end into a threaded circular flange 182 which may be inserted into the axial bore of the tuyere body so that the flange rests against the annular shoulder 147 of the nose portion of the tuyere body. The threaded tuyere pipe 181 may be locked in place in the tuyere pipe flange 182 by means of a set screw 183 screwed through a threaded bore in the wall of the flange at the annular groove 184. A removable insert 185 serving to prevent the punch rod from impacting on shoulder 147 is mounted in the interior space 155 of the tuyere body. It has a cylindrical portion 189 having a cut-out portion 186 so that the air passageway through hollow leg 153 communicates with its interior space. The cylindrical end portion 187 is reduced in diameter and is connected with the portion 185 by a tapered portion 188 to provide a guide throat for the punch rod 30 into the tuyere pipe 181. The inner end of the insert 185 engages the tuyere pipe flange 182 and the outer end engages the flange 167 when the tuyere body is in assembled condition and serves to prevent the tuyere pipe from moving out of its proper position.

It will be seen from the foregoing that when the punch rod 30 is driven forward in a punch stroke to punch the tuyere, the punch rod first enters the tuyere body through opening 176 then passes through the opening in the seal ring 173. It continues into the tuyere body, unseating the flap valve 157 which swings upwardly on pivot pin 158, out of the path of the punch rod. Because the punch rod is of uniform diameter and there is minimum clearance between the rod 30 and seal ring opening 174, there can be no material discharge of compressed air from the tuyere body to the atmosphere. Since the seal ring is free to move in its retainer and is tapered, the punch rod is thus permitted to engage the close fitting opening even if the punch rod is not in perfect alignment with it.

In FIG. 9c there is shown a modified form of tuyere body 143a. In this modification a ball valve 157a is employed instead of a flap valve. The ball 157a when the punch rod is in retracted position seats on valve seat 165a to prevent flow of compressed air to the outside atmosphere. When the punch rod is moved into the tuyere body through the opening 166a, the ball, serving as a valve, is moved away from its seat into a passageway 144a which communicates with the interior cavity 155a of the tuyere body. The sleeve insert 185a also is modified and is cut off at an angle as shown at 189a to provide for free movement of the ball to its open position shown in broken line 157b and to its closed position as shown in unbroken line 157a in FIG. 9c.

In hand punching it is normally necessary to use a headed rod in order to open a sufficiently large hole in a plugged tuyere to provide adequate air flow. A full length rod of this required diameter would be prohibitively heavy for a workman to manipulate by hand. Since the tuyere body opening must be large enough to accommodate the enlarged head of the rod, it is evident that when it is inserted there will be considerable leakage of compressed air into the atmosphere through the annular space between the relatively small shank of the rod and the external opening of the tuyere. The construction provided by this invention eliminates that drawback. Moreover, whenever the refractory lining of a converter has to be replaced, common practice requires that the tuyere bodies be taken off the converter, the pipe remnants unscrewed from the tuyere body castings, new pipes screwed in, and the complete assembly then reinstalled. Furthermore, a conventional tuyere that becomes so badly plugged during a converter blow that it cannot be reopened, remains useless to the converting process for the remainder of that converter campaign. This drawback is eliminated by the tuyere herein disclosed. It is possible simply to remove the face plates 175, 170, 167 (see FIG. 9) which affords access to the interior of the tuyere body. The insert 185 may be removed and then the tuyere pipe retaining flange 182 may be unscrewed with a spider wrench fitting into oppositely disposed holes 190 in the flange and the tuyere pipe flange removed. Then the remaining remnant of the tuyere pipe can be withdrawn or driven into the converter. To reassemble, a new length of tuyere pipe is screwed into the tuyere pipe flange and inserted through the tuyere body and then the other parts replaced and reassembled without removing the tuyere body casting from the converter.

The embodiment of the invention, as shown, in which a hydraulic system operates the puncher, comprises two pumps 33 and 34 mounted on reservoir 36 and driven by a two shaft electric motor 191; the pump 34 being smaller than pump 33; a hydro-pneumatic accumulator 35; and a number of pressure, relief, and solenoid valves. The discharge of one of the pumps is directed to one or the other, end of the punch cylinder 103, depending on the position of solenoid operated valves, and controls the direction of the stroke of the punch rod 30. The other pump discharges at a higher pressure that the first pump, to the accumulator 35 which serves as a pressure reservoir to supplement pump capacity. When resistance is met on the "in" stroke of the punch rod due to an accretion in the tuyere, automatic closure of a pressure switch will, through a series of relays, energize a solenoid to open the accumulator valve, allowing the accumulator pressure to bolster the speed and force of the puncher. When the pressure is relieved, i.e., when the tuyere accretion has been removed, a pressure switch is opened, additional relays energized, and the solenoids controlling both the punch retraction valve and a quick exhaust valve are actuated. This permits immediate and rapid withdrawal of the punch rod from the tuyere, limits its penetration into the molten converter bath, and minimizes the amount of incrustation dragged back into the tuyere on its retraction stroke. The hydraulic circuit is further explained hereinafter in connection with the schematic wiring and piping diagrams of FIGS. 10, 11 and 12.

Further details of the construction of the accumulator 35 are shown in FIG. 8. It comprises a vertically disposed cylinder 192 having a top closure head 193 bolted to the upper end and a bottom closure head 194 bolted to the lower end of the cylinder; the cylinder being securely mounted on a plurality of circumferentially spaced supporting posts 196 secured at their bottom ends to a support base 197 which may rest on a suitable foundation.

Mounted for vertical reciprocation within the cylinder 192 is a piston 198 having a plurality of piston rings 199. Mounted in the upper face 200 of the piston is a centrally located tapered stop cushion plug 201 of resilient material and mounted in the lower face 202 of the piston is a similar tapered stop cushion plug 203. The upper and lower heads 193, 194 have a central threaded bore 204, 205. When the piston 198 is in its uppermost position, cushion plug 201 seals bore 204 and when in its lowermost position, cushion plug 203 seals bore 205. Connected to bore 204 is a pipe 206 connected to a gas bottle 207 which may carry a pressure up to about 1500 pounds per square inch. Connected to bore 205 is a pipe 208 which connects to the hydraulic fluid system. The hydraulic fluid circuit is described in further detail later on in connection with FIG. 10.

Figure 3:
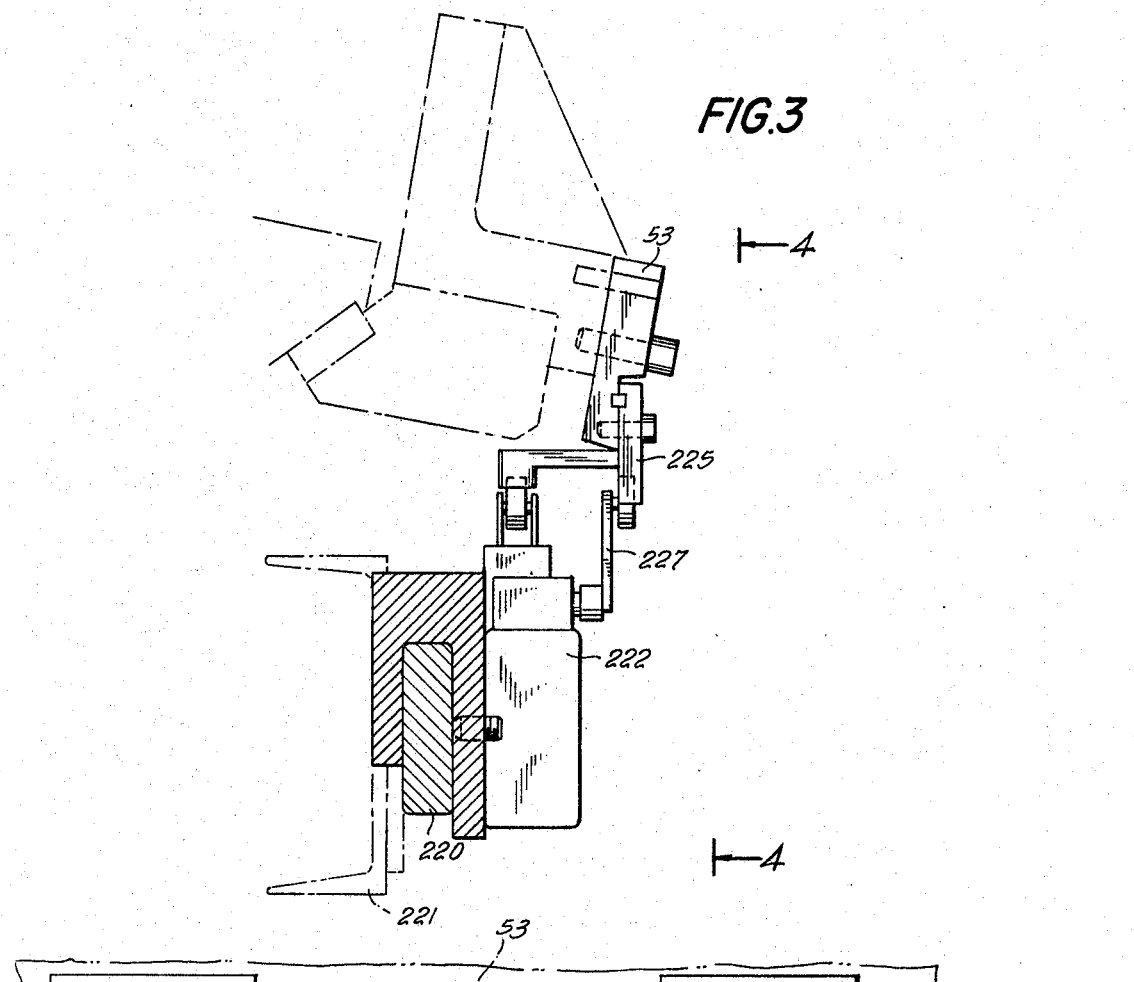
FIG. 3 is a view on line 3—3 of FIG. 1 illustrating the means for actuating limit switches mounted along the carriage guidetrack.
Figure 4:
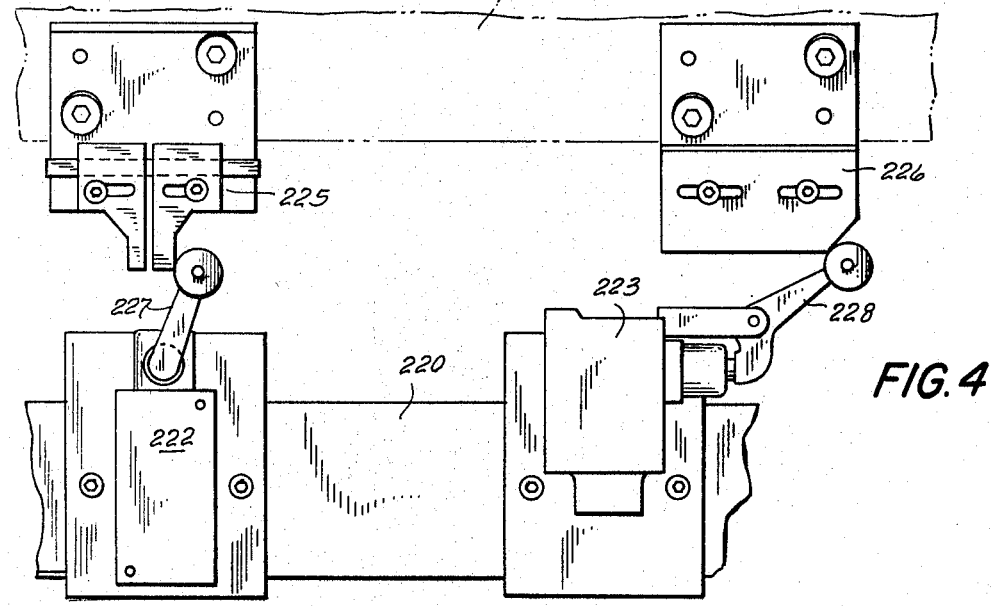
FIG. 4 is a view in elevation on line 4—4 of FIG. 3.

Referring now to the puncher 28 (see FIG. 1) which includes the carriage 19 having rollers 27 mounted to roll on tracks 24, 25, the arrangement is such that the carriage and hence the puncher can travel along the tracks and be stopped at a position opposite any selected tuyere in the row 16 of tuyeres with the punch rod in alignment with the selected tuyere to be punched. The mechanism for doing this is perhaps best shown in FIGS. 3 and 4, considered with FIGS. 1, 5, 6 and 7. A switch bar 220 extends along the length of the path of travel of the puncher carriage 19 and is fixedly secured to a suitable frame member 221 on the carriage platform 23. Mounted in spaced relation along the switch bar 220 are a plurality of micro-switches 222—one for each tuyere 17 of the row of tuyeres 16; a switch being positioned opposite its tuyere. These switches 222 correspond to the switches designated 1MS—24MS in the wiring diagram (FIG. 11). At one end of the switch bar is mounted a reversing micro-switch 223, and at the other, a reversing micro-switch 224. These micro-switches are actuated by suitable cams mounted on the puncher carriage 19. Referring more particularly to FIGS. 3 and 4, there is mounted on the carriage saddle frame 53, an adjustable trip cam 225 and an adjustable trip cam 226. Trip cam 225 on the puncher carriage is adjusted so that as the carriage moves on the track, it trips the levers 227 of each of the tuyere micro-switches 222 which are positioned on the longitudinal switch bar 220. There is a micro-switch opposite each tuyere and the micro-switches 222 are mounted and adjusted at intervals along the switch bar, so that when the carriage is moved on its tracks, it will be stopped when switch cam 225 trips the lever 227 of a particular micro-switch 222 and the wiring hook-up is such that the carriage is stopped opposite the particular tuyere with the punch rod of the puncher in alignment with the tuyere at the location of the micro-switch on the switch bar for that tuyere. It will be noted that the cam 225 will trip the micro-switch lever 227 whether the carriage is moved in one direction, or the other, along the carriage platform to stop the carriage at a position opposite the tuyere.

Also mounted on the carriage saddle frame member 53 is reversing cam 226 and on the switch bar 220 is a reversing micro-switch 223 at one end and reversing micro-switch 224 at the other end. Assuming that the puncher carriage is moving to the right along the platform (as viewed in FIG. 1) and has reached the last micro-switch 222 and is then moved beyond it in the same direction, then reversing cam 226 on the carriage will trip reversing switch lever 228 of reversing micro-switch 223 (see FIG. 1). The reversing switch 223 will then change the electric circuit (as hereinafter described) to reverse the direction of rotation of drive motor 31 and this will cause the puncher carriage to travel in the opposite direction along the carriage trackway 24, 25. When the carriage reaches the other end of the trackway, the reversing cam will trip the lever of reversing micro-switch 224 (see FIG. 1) and this will reverse the current and cause the carriage to travel again from left to right (as viewed in FIG. 1), bearing in mind that when the cam 225 trips a lever of a micro-switch 222, the carriage is automatically stopped and the tuyere puncher can then operate through its punching cycle to punch the tuyere corresponding to that particular micro-switch.

The hydraulic circuit on the side 200 of the piston 198 of accumulator 35 (see FIGS. 8 and 1) which is connected to the gas pressure container 207 through pipe 206, is charged with gas under high pressure and the hydraulic circuit on the opposite side of the reciprocable piston 198 and the space connected to pipe 208, is charged with hydraulic liquid, preferably oil. The hydraulic fluid in the accumulator is maintained under a pressure substantially higher than the pressure normally supplied by the pump 33 and it provides an auxiliary or secondary source of pressurized hydraulic fluid under pressure greater than the primary source of pressurized hydraulic fluid supplied by the pump 33. As described hereinafter, the pipe 208 is connected with the hydraulic circuit which contains the oil for driving the piston 118 of the puncher hydraulic cylinder 103. The gas under pressure in the gas container 207 may be an inert gas, such as nitrogen, or if desired, it may be compressed air, unless the danger of the oil catching fire in case of leaks is considered to be too great. The pressure on the gas side in container 207 may be at any desired pressure up to 1500 pounds per square inch or even higher if desired. Hence, the pressure exerted on the oil in accumulator 35 by the movable piston 198 may be a correspondingly high pressure. A pressure of 800 to about 1200 pounds per square inch is satisfactory for normal conditions of operation of the accumulator 35.

Figure 10:
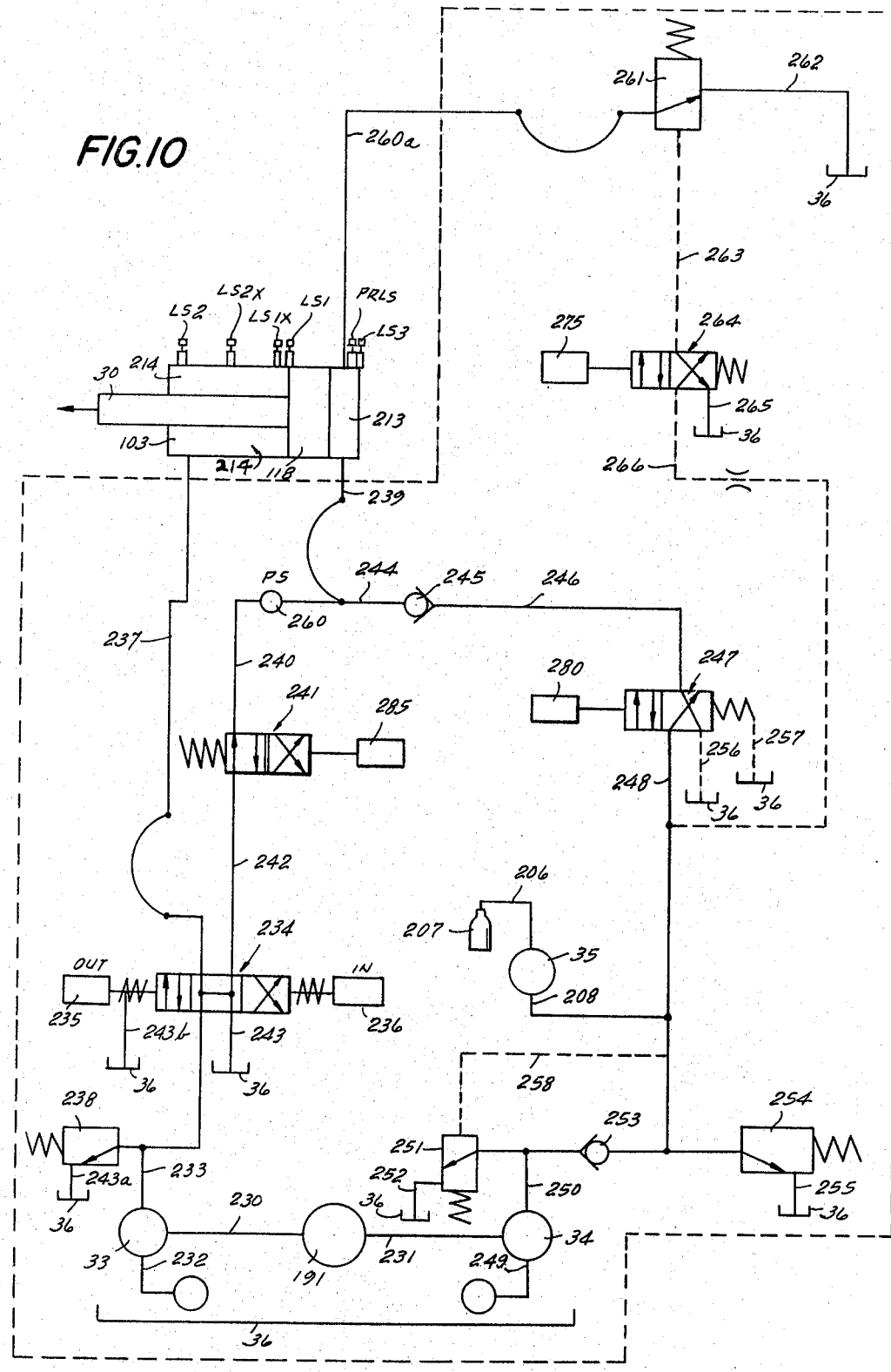
FIG. 10 is a wiring and piping diagram to illustrate the arrangement of the hydraulic system.

Referring now more particularly to FIG. 10, which is diagrammatic, a suitable quantity of oil, or other suitable hydraulic liquid, is maintained in the storage reservoir 36, it being noted that in the diagram (FIG. 10) the reference character 36 in each instance indicates the same reservoir 36 as shown in FIG. 1. This manner of indicating the reservoir 36 simplifies the diagrammatic illustration of FIG. 10. The punch hydraulic cylinder shown diagrammatically in FIG. 10 is indicated by reference character 103 as in other figures (see FIG. 5). Rotary pumps 33 and 34 are operated by electric motor 191 through a common shaft 230, 231. Pump 33 takes suction through pipe 232 (see FIG. 10) and discharges through pipe 233 to a four way, two solenoid valve 234. An "out" solenoid 235 is connected to solenoid valve 234 and an "in" solenoid 236 is connected to valve 234. Pipe 237 is connected to the forward end of punch cylinder 103. A pressure relief valve 238 is connected to pipe 233. A return pipe 243A connects valve 238 to reservoir 36. Pipe 239 is connected to the rear end of puncher cylinder 103 behind piston 118 and this pipe is connected to pipe 240 which in turn is connected through two way solenoid valve 241 to pipe 242 through four way valve 234 to pipe 243 to reservoir 36. A pressure switch valve 260 is connected into line 239 leading into the cylinder space 213 behind piston 118 for a purpose later described.

Pipe 239 is also connected to pipe 244 which is connected through check valve 245 to pipe 246 which is connected to solenoid valve 247, which in turn is connected to pipe 248. Check valve 245 permits flow of hydraulic fluid only from pipe 246 toward pipe 244 but not in the opposite direction. Pipe 208 from accumulator 35 is connected to pipe 248. The solenoid valve 247 may discharge through pipe 256 or pipe 257 to reservoir 36, or may pass fluid to cylinder 103.

Rotary pump 34 takes suction in reservoir 36 through pipe 249 and discharges the hydraulic fluid in the reservoir through pipe 250. A pressure relief valve 251 is connected to pipe 250 and it discharges through pipe 252 to reservoir 36. Pipe 250 is connected through check valve 253 to pipe 248, this valve permitting flow of fluid in a direction away from pump 34 but not toward it. A pressure relief valve 254 is connected to pipe 248 and it discharges through pipe 255 to reservoir 36. A pipe 258 connects pipe 248 with valve 251.

A quick exhaust pipe 260A is connected to the rear end of puncher cylinder 103 behind piston 118 and to a quick exhaust valve 261. This valve may exhaust through pipe 262 to reservoir 36. Pipe 263 connects quick exhaust valve 261 with solenoid pilot valve 264. A pipe 265 connects valve 264 with reservoir 36. And a pipe 266 connects pilot valve 264 to pipe 248.

The discharge pipe 233 of the large pump 33, which provides a primary source of pressurized hydraulic fluid, leads to relief safety valve 238, thence to two solenoid valve 234. This is a two solenoid, four way, three position, spring centered open center pilot operated valve. Pilot pressure for operation of this valve is provided from the accumulator, as later described. In the center position de-energized, this valve opens the pump discharge through pipes 237 and 239 to the two ends of the hydraulic cylinder 103 to reservoir 36, allowing the pump to operate at normal pressure, with lower power consumption. Under these conditions there is no movement of the punch ram 30.

When one of the two solenoids of the valve 234 is energized, the discharge of pump 33 is directed to one end of the punch cylinder 103, while the other end of the cylinder is connected through this valve to the reservoir 36 and the punch 30 will move in one direction. When the other solenoid of valve 234 is energized, the connections through the valve are reversed and the punch ram moves in the opposite direction.

Referring now to the small pump 34, its discharge pipe 250 branches. One goes to by-pass valve 251, which the present, is assumed to be closed. The other branch discharges the pump volume through the in-line check valve 253 into pipe 248 past the relief or safety valve 254 to the accumulator 35, charging the accumulator under pressure which will be determined by the gas pressure in the accumulator bottle 207, which is substantially higher than the pressure provided by pump 33. When the accumulator is full charged, pressure will build up sufficiently to cause the by-pass valve 251 to open because of the pressure in pipe 258. The small pump 34 will now discharge through valve 251 and pipe 252 back to the reservoir at nominal pressure, but pressure and volume will be maintained in the accumulator since the volume is confined by in-line check valve 253 and the accumulator discharge valve 247, which is now in its closed position.

When the punch ram 30 is operated through its forward or "in" stroke and resistance is met to the forward movement of the punch ram in the tuyere, pressure will be built up in the space 213 back of the piston 118, and pressure switch 260 will be actuated, energizing electrical circuits, hereinafter described, to cause valve 247 (see FIG. 10) to discharge through pipe 208, 248, valve 247 and check valve 245 thereby to speed up the punch and also to exert high pressure in space 213 and on the piston 118. Check valve 245 functions to prevent the discharge of pressure liquid from pump 33 from backing up into the accumulator 35 or back through valve 247 to the reservoir. The actuation of pressure switch 260 will also operate valve 241, which will keep the high pressure oil from backing through valve 234 to relief valve 238 back to the reservoir.

When the punch ram 30 is to be reversed by anyone of the methods described later in connection with the electrical circuits, two solenoid valve 234 will be reversed by de-energizing one solenoid and energizing the opposite solenoid. The pump 33 will now discharge through pipe 237 to the forward end of the hydraulic cylinder and the liquid back of the piston 118 in the rear end of the cylinder will discharge through pipe 239, 240, valve 241, pipe 242, valve 234 and pipe 243b to the reservoir 36.

Since the area of the piston 118 on the piston rod side exposed to pressure is smaller than the opposite or rear side of the piston, the volume of liquid that must be moved on each side of the piston for a given increment of lineal movement, forwardly or rearwardly, of the piston is different. A quick exhaust relief valve 261 is provided to care for the greater volume of liquid from the rear end of the cylinder when the punch rod is operated outwardly i.e., in retracting direction. Quick exhaust valve 261 is normally closed during the "in" or forward movement of the punch and when the machine is idle. It is opened during the "out" or retracting movement of the punch. When open, the hydraulic liquid flows from the rear of the cylinder through pipe 260A through the exhaust valve 261 and pipe 262, back to reservoir 36. The opening of valve 261 is controlled by the pilot valve 264. Simultaneously with the reversal or retracting movement of the punch, the solenoid 275 of pilot valve 264 is energized; allowing pilot pressure from the accumulator in pipe 266 to pass through valve 264 and pipe 263 to the pilot cylinder of valve 261, which opens valve 261 to pipe 262, back to the reservoir thus providing an extra exhaust for the rear end of the punch cylinder when the punch is moving in the "out" direction, so that it will be retracted more rapidly.

When the punch approaches the end of its "out" stroke, a trip dog 140 on the stroke control rod 120 (see FIGS. 5 and 10) will actuate limit switch LS3. This will de-energize the respective solenoids of valves 234 and 264, closing valve 264 and causing valve 234 to come to its midposition; the hydraulic liquid will then by-pass pump 33 and flow through pipe 243b back to reservoir 36. This action provides a cushioning of the punch rod 30 as it approaches the fully retracted position, and the puncher is then ready for its next punching cycle.

Referring again to the punch cylinder, it may, if desired, be designed as to size and strength to produce a total pressure of up to about twenty tons on the piston when it is moving in its forward stroke. The total pressure that can be exerted on the piston will, of course, depend on the pressure carried in the accumulator. The pressure builds upon the piston only to an extent or intensity necessary to overcome the resistance of accretions in the tuyere being punched. This high pressure of the accumulator may never be reached in actual operation. If it is reached, the machine will stall. Hence, a timer circuit is preferably provided to reverse the punch a given number of seconds after the forward stroke has commenced. This operation is described later in connection with the description of the electric circuit in FIG. 12.

Maximum stalling pressure may be set at any desired pressure lower than the accumulator pressure capacity by setting the relief valves accordingly, with corresponding lowering of the gas pressure in the accumulator. Because of the high speeds of movement of the puncher, elastomer cushions may be provided at each end of the cylinder to serve as bumpers. However, the positions of the limit switches LS1X and LS2X are adjusted on the cylinder to control the length of stroke of the punch ram 30 by selectively energizing electrical circuits to actuate valve 234. It is preferable to adjust limit switches LS1X, LS2X, or similar switches if incorporated, so that they be selectively actuated by dog 140 on control rod 120 on the "in" stroke as the end of the pump ram reaches the desired degree of penetration. All of the six limit switches PRLS, LS1X, LS2X, LS1, LS2, and LS3 may be operated by a single trip dog on the control rod. Or, if desired, separate control rods, each with an adjustable trip dog may be provided to bring about the desired operation and control of the punch.

The following is a description of the operational details of the electrical and hydraulic systems for the automatic tuyere punching machine of the present invention. The electrical circuit for the hydraulic cylinder and punch ram may be conveniently referred to as the "puncher" electrical circuit and the electrical circuit for the travelling carriage on which the hydraulic cylinder is mounted, may be conveniently referred to as the "carriage" electrical circuit.

I. For operation of the puncher, either in the manual or automatic control mode, the following four preliminary steps must be taken:

(1) When the "Start" button 304 (FIG. 12, line 1) is pushed, the coil of the relay M1 (line 1) for the pump motor 191 is energized. Energization of this coil closes a set of associated contacts M1 providing (1) a holding circuit (line 2) for coil M1 after the "Start" button retracts, and (2) a circuit connection of the motor 191 to its three-phase power supply, thus starting up pumps 33 and 34 (FIG. 10).

(2) Before carriage 19 can be moved, punch rod 30 must be in its normal, fully-retracted position with limit switch PRLS (FIG. 11) closed. Switch PRLS (Punch Retracted Limit Switch), which acts as an interlock for the punch and carriage and is located on the rear top of punch cylinder 103 (see FIG. 10), is actuated by the trip 140 on control rod 120 (see FIG. 5) when the punch rod is fully retracted. Thus, only when the punch rod is so retracted will be normally-open contacts LR (FIG. 12, line 7) of the latching relay LR (FIG. 11) be closed, thereby permitting the relay CR1 (FIG. 12, line 5) to be later energized when the "In" button is pushed, as described below in paragraph II (2). In the event the punch rod 30 is not in its retracted position, then the "out" button 314 (line 21) is pushed, and the punch rod will be retracted as described below in paragraph II (3).

(3) The Selector Switch 302 (FIG. 11) is next turned to the "Automatic" position which sets up the latching relay LR for energization now that the punch rod 30 is fully retracted and switch PRLS is closed.

(4) The carriage motor 31 (FIG. 11) is then started by depression of either the "FORWARD START" button 306 or the "REVERSE START" button 308 which energizes respective relay coils "F" or "R" to close associated contacts for connecting the carriage motor 31 to its three-phase supply.

II. For hand operation of the puncher the following procedure is taken after completion of the preliminary steps described above:

(1) The Switch 310 (FIG. 12, line 32) is turned to the H (hand) position, thereby energizing the coils of relay CRAH (line 32) which closes the contacts H (line 5) and brings the "Accumulator" button 316 (line 8) as well as the "Out" button 314 (line 22) into the circuit.

(2) The "In" button 312 (FIG. 12, line 5) is pushed next, completing the energizing circuit for relay CR1 (line 5) and thus actuating the associated CR1 contacts (lines 7, 21, 29 and 34). In particular when the pair of CR1 contacts (line 34) in the energizing circuit for the "In" solenoid 236 of the valve 234 (FIG. 10) are closed, pressurized fluid from the pump 33 is directed to space 213 of cylinder 103 and the "In" stroke of the punch rod 30 is initiated.

(3) The punch rod 30 is retracted by depression of the "Out" button 314 (FIG. 12, line 21) which energizes the coil of relay CR2 (line 21) and thereby actuates the associated CR2 contacts (lines 5, 12, 26 and 37). This completes electrical circuits (1) energizing the "Out" solenoil 235 for the valve 234 (FIG. 10), thus diverting pressurized fluid from the pump 33 to the other side of the piston for the punch rod 30 in the cylinder chamber 103, i.e., to the space 214 in the fore end of the cylinder, and (2) energizing solenoid 275 on pilot valve 264 which in turn actuates quick exhaust valve 261 (FIG. 10). As described previously, actuation of quick exhaust valve 261 provides a path for exhausting the pressurized fluid, previously supplied to the rear end space of the punch cylinder 103 during the "In" stroke, to the reservoir 36 when the "Out" stroke of the rod is commenced.

(4) In manual operation the carriage 19 is moved on tracks 24, 25 from the tuyere just punched to an adjacent one when the "Index" button 318 (FIG. 11) is pressed. This completes a circuit through switch PRLS for energizing of two magnetic coils of latching relay LR. This coil latches and holds the relay in until the second coil is later energized by the closing of one of the position micro-switches 222. With the relay in latched state, the LR contacts in the energizing circuit 320 for the brake 72 (FIG. 1) are opened and the LR contacts in the circuit 322 for the clutch 72a (FIG. 1) are closed. Consequently, with the brake 72 off and the clutch 72a engaged, the carriage 19 will move until it is stopped by the closing of the nearest most of the twenty-four micro-switches 222 (IMS—24MS, FIG. 11) situated along the carriage track. Each of the micro-switches 222, when closed, will complete the energizing circuit for the coil of the latching relay LR to unlatch the relay, thereby actuating the respective LR contacts for deenergizing the circuit 322 for the clutch 72a while energizing the circuit 320 for setting the brake 72. In addition, reversing micro-switches, "FWD MS" 223 and "REV MS" 224, are located one at each end of the switch bar 220 paralleling the carriage track and, when actuated by the carriage cam, will disengage the clutch 72a and set the brake 72 by a circuit operation through relay LR similar in manner to that effected by the micro-switches 222. At the same time actuation of either the forward or reversing micro-switch 223 or 224 will energize the respective relay coil F or R, and produce a switching over between the corresponding sets of contacts F324 and R326 in the control circuit for carriage motor 31, so that the motor will be reversed when the carriage 19 reaches the end of its travel in a particular direction. A delay of about a half-second is provided by relay "TDR" (FIG. 11), so that the energizing circuit for the coil of the latch relay LR, which controls the actuation of the brake and clutch circuits 320 and 322 is not completed until the cam on the travelling carriage is well clear of any particular micro-switch 222. This time delay arrangement temporarily inhibits the control effected by the micro-switches 222, and allows the carriage to move past the stopping position produced by the actuation of the last micro-switch and advance to the next tuyere location when the "Index" button 318 is pressed.

(5) If the punch is not in proper horizontal alignment with the tuyere to be punched, it may be moved for small increments of distance by depression of either the "FORWARD START" or "REVERESE START" buttons 306, 308 (FIG. 11) to start the carriage motor 31 in the desired direction, and then a holding down of the "inch" button 328 until the correct distance has been traversed. As may be seen, depression of the "Inch" button 328 releases the brake and engages the clutch, thereby allowing the carriage to advance by means of a bypass around the control operation nominally effected on the energizing circuits for the clutch and brake coils 320, 322 by the contacts of the latching relay LR.

(6) In the event that a tuyere is tightly plugged, an alarm is sounded to call the attention of the operator to this fact in the following manner. On Manual control, i.e., with Selector Switch 310 turned to the H position (FIG. 12, line 32), when the "In" button 312 (line 5) is pressed, starting the inward stroke of the punch rod as described in paragraph II(2) above, the normally-open contacts CR1 (line 29) are closed by the energization of its associated relay coil (line 5) and timer relay TD1 (line 28) in turn is energized. When the timer TD1 times out, the coil of relay CTD (line 26) will be energized, closing its contacts CTD (line 30) and energizing the coil of contact relay CR14 (line 30) which in turn closes a holding circuit through one set of its contacts CR14 (line 30) which in turn closes a holding circuit through one set of its contacts CR14 (line 31) and energizes the alarm solenoid 330 (line 39) via its other set of contacts CR14. On hearing the alarm, the operator will release the "In" button 312 (line 5) and depress the "Out" button 314 (line 21), thereby energizing the coil of the CR2 relay (line 21) which, via its associated contacts CR2, will actuate the solenoids 235 and 275 (lines 37 and 38) on valves 234 and 264 (FIG. 10) to retract the punch in the manner previously described.

(7) The length of the stroke of the punch may be regulated, if desired, by the selective use of limit switches LS1X and LS2X (FIG. 12, line 33) which are set prescribed distances apart along the length of the punch cylinder 103 (see also FIGS. 5 and 10). Of course, it will be understood that additional limit switches of this type could be readily incorporated into the circuit if more latitude in control of the depth of penetration of the punch ram is desired. The punch rod 30 on its inward stroke will actuate whichever of the limit switches, LS1X or LS2X, is connected into an energizing circuit by the three-position switch 332 (FIG. 12, line 33), causing the coil of time delay relay TD2 (line 33) to be energized and, after a time interval, opening its normally-closed contacts TD2 (line 7) in the energizing circuit for relay CR1 (line 5). The de-energization of the CR1 relay in turn allows its set of normally-closed contacts CR1 in the circuit of contact relay CR2 (line 21) to close, thus energizing the coil and closing the contacts of CR2, which then actuates the respective solenoids (lines 37 and 38) for the valves 234 and 264 (FIG. 10) and causes the punch rod to retract.

III. For automatic operation of the puncher the following procedure is taken after completion of the preliminary steps described above in paragraph I.

(1) The switch 310 (FIG. 12, line 32) is turned to the A (automatic) position, thereby de-energizing the coil of relay CRAH and allowing the normally-closed contacts CRAH (line 3) to close.

(2) The "In" button 312 (FIG. 12, line 5) is pushed next, completing energizing circuits for relays CR1 (line 5) and CR8 (line 3) which are then held, after pressure is released from the "In" button, through holding circuits provided by contacts CR8 (line 4) and CR1 (line 7) for relay CR1, and by contacts CR8 (line 3) for relay CR8. With relay CR1 energized, contacts CR1 (line 34) close, thereby energizing the "In" solenoid 236 for the valve 234 (FIG. 10) and initiating the "In" stroke of the punch rod 30 in the manner described above in paragraph II(2). The contacts of limit switch LS1 (line 12) are closed by the inward travel of the punch rod, thereby energizing relay CR11 (line 12) which holds itself in by a circuit provided through one of its sets of contacts CR11 (line 13).

If resistance should be encountered by the punch as it travels inwardly through the tuyere, then the resultant build-up in pressure in supply line 239 for the cylinder 103 (FIG. 10) will actuate pressure switch 260, closing its normally open contacts PSA (FIG. 12, line 10). The closing of contacts PSA will complete an energizing circuit for relay CR3 (line 11) which in turn will cause solenoids 280 and 285 (lines 35 and 36, FIG. 12) to actuate their respective valves 247 and 241 (FIG. 10) in order to apply accumulator pressure to space back of the piston in the cylinder 103 while preventing the accumulator from discharging into the tank. When the obstruction has been removed, and the pressure drops as the punch rod breaks through, the contacts PSA (FIG. 12, line 10) of the pressure switch 260 (FIG. 10) will come open, diverting accumulator pressure from the cylinder 103 to the reservoir 36 (FIG. 10), as the normally-closes contacts PSB (FIG. 12, line 17) of the pressure switch 260 (FIG. 10) drop in. The closing of contacts PSB will complete an energizing circuit for relay CR12 (FIG. 12, line 17) through contacts CR11 and CR3 which have been closed earlier in the operation. With the coil of relay CR12 energized, an energizing circuit will be provided for relay CR2 (line 21) through a path provided by closed contacts CR1 (line 21) CR12 (line 23), and another set of CR12 contacts (line 18). The energization of relay CR2 (line 21) will in turn actuate the respective solenoids 235 and 275 on four way valve 234 and pilot valve 264 (FIG. 10) to cause retraction of the punch in the manner previously described in paragraph II(3).

However, if no substantial build-up of accretions is encountered by the punch rod on the inward stroke and the accumulator is not brought into play, then the punch rod will be reversed when the contacts of limit switch LS2 (FIG. 12, line 19) are closed. This switch functions similarly to limit switches LS1X and LS2X previously described, to control the depth of penetration of the punch rod into the converter. The actuation of limit switch LS2 energizes relay CR13 (line 19), causing its normally-closed contacts CR13 (line 15) to open and its sets of normally-open contacts CR13 (lines 20 and 24) to close, thereby forming a holding circuit for relay CR13 while energizing relay CR2 (line 21). With the coil of CR2 energized, its contacts CR2 (line 37) will be closed, and the solenoids 235 and 275 on the respective valves 234 and 264 actuated to cause retraction of the punch at the end of its inward stroke. On the other hand, when a substantial resistance is encountered by the punch rod on its "In" stroke and the extra pressure boost is given to the punch by the accumulator supply is insufficient to remove the accretion on a single stroke of the rod, a control circuit is provided for retracting the rod after a predetermined interval of time. After relay CR3 (FIG. 12, line 10) has been energized by the actuation of the pressure switch PSA (line 10), a time delay relay TD1 (line 28) is set into operation. When the time has turned out, its normally-open contacts TD1 (line 26) will close, energizing relay CTD which in turn will complete an energizing circuit for relay CR2 (line 21) via its contacts CTD (line 25) and cause reversal of the punch in the manner previously described.

Cushioning of the punch rod at the extremity of its retraction or "Out" stroke is provided by the actuation of limit switch LS3 whose normally-closed contacts (line 27) open and de-energize the coil of relay CR2 (line 21), thereby stopping the punch by opening the energizing circuits for the solenoids 235 and 275 controlling the valves 234 and 264 (FIG. 10).

(3) In automatic operation the punch carriage is moved from one tuyere to the next by the same procedure used in the manual operation mode by use of the "Index" and "Inch" buttons 318 and 328 (FIG. 11) as described in paragraphs II (4 and 5).

It will be understood that certain features of the invention may, in some instances, not be used in embodiments of the invention wherein the benefits of all features of the invention described herein are not desired; and it also will be understood that the terms and expressions which have been employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A tuyere punching machine for punching the tuyeres of a converter having a row of tuyeres in a wall thereof through which air is blown beneath the surface of a molten bath contained in said converter which comprises a platform mounted alongside said converter independently of said converter, a guideway on said platform along said row of tuyeres, a power driven carriage movable along said guideway, an hydraulic cylinder mounted on said carriage and having a reciprocable piston therein, a punch ram connected to said piston, means for adjusting the position of said hydraulic cylinder on said carriage for axial alignment of said ram with selected tuyeres in said row, said ram when aligned with a selected tuyere being operative from its normal retracted position to move in a forward stroke into said tuyere for punching accretions in said selected tuyere and to be retracted from said tuyere on its rearward stroke to normal retracted position, an hydraulic circuit containing a pressurized hydraulic fluid connected to said cylinder for driving said piston with its connected ram in a forward stroke and in a retraction stroke, control valves connected into said pressurized hydraulic circuit operative to control flow of hydraulic fluid in said hydraulic circuit, a puncher electric circuit having switches controlling the operation of said control valves, certain of said switches being selectively operative in response to predetermined depth of penetration of said ram into said selected tuyere on its forward stroke to operate certain of said control valves to control flow of hydraulic fluid in said hydraulic circuit when said depth of penetration is reached to reverse the forward movement of said ram and retract it.

2. A tuyere punching machine for punching the tuyeres of a converter having a row of tuyeres in a wall thereof through which air is blown beneath the surface of a molten bath contained in said converter which comprises a platform mounted alongside said converter independently of said converter, a guideway on said platform along said row of tuyeres, a power driven carriage movable along said guideway, an hydraulic cylinder mounted on said carriage and having a reciprocable piston therein, a punch ram connected to said piston, means for adjusting the position of said hydraulic cylinder on said carriage for axial alignment of said ram with selected tuyeres in said row, said ram when aligned with a selected tuyere being operative from its normal retracted position to move in a forward stroke into said tuyere for punching accretions in said selected tuyere and to be retracted from said tuyere on its rearward stroke to normal retracted position, an hydraulic circuit containing a primary source of pressurized hydraulic fluid connected to said cylinder for driving said piston with its connected ram in a forward stroke and in a retraction stroke, control valves connected into said pressurized hydraulic circuit operative to control flow of hydraulic fluid in said hydraulic circuit, a puncher electric circuit having switches controlling the operation of said control valves, a source of auxiliary pressurized hydraulic fluid connected to said hydraulic circuit, and a pressure responsive valve connected into said hydraulic circuit and actuated in response to a predetermined hydraulic pressure in said hydraulic cylinder in the space behind the piston for controlling the flow of pressurized fluid from said auxiliary source into said hydraulic circuit in a manner to increase the fluid pressure behind said piston upon actuation of said pressure responsive valve.

3. A tuyere punching machine according to claim 1 having an accumulator connected into said hydraulic circuit in which is carried an auxiliary pressurized hydraulic fluid at higher pressure than said primary source, a pressure responsive valve connected into said hydraulic circuit actuated in response to a predetermined hydraulic pressure in said hydraulic cylinder in the space behind said piston, said pressure responsive valve when actuated at said predetermined pressure causing said auxiliary pressurized fluid to flow from said accumulator into said space to exert its pressure on said piston.

4. A tuyere punching machine according to claim 2 in which a time delay switch is connected into said electric circuit which is actuated after a predetermined time interval after actuation of said pressure responsive valve and after said auxiliary pressurized fluid flows into said cylinder, which time delay switch upon actuation causes the control valves connected into said hydraulic circuit to direct flow of pressurized hydraulic fluid in said hydraulic circuit into said cylinder to cause said piston to retract said puncher ram to normal retracted position.

5. A tuyere punching machine according to claim 3 in which a time delay switch is connected into said electric circuit, said time delay switch being actuated in the event that said puncher ram stalls in its forward stroke upon encountering an accretion in the tuyere being punched after said pressure responsive valve is actuated and said auxiliary pressurized fluid from said accumulator is flowed into said space behind said piston, said time delay switch being actuated after a predetermined period of time after said puncher ram is so stalled in its forward movement and thereby controlling said control valves in the hydraulic circuit to cause flow of pressurized fluid in said hydraulic circuit and cylinder in a manner to retract said piston and puncher ram to normal retracted position.

6. A tuyere punching machine according to claim 1 which includes power driven means connected to move said carriage along said guideway along said row of tuyeres, a carriage electric circuit having switches and connected to control the operation of said power driven means, certain of said switches when actuated being operative to control the operation of said power means to cause said carriage to move selectively in one direction and in the opposite direction on said guideway along said row of tuyeres and to stop the movement of said carriage opposite any selected tuyere in a position in which the punch ram is aligned for punching said selected tuyere.

7. A tuyere punching machine according to claim 6 having a plurality of micro-switches mounted on said platform in spaced relation along said guideway, one opposite each tuyere, a tripper means connected to each micro-switch operative to actuate its micro-switch, a tripper cam mounted on said carriage operative to engage and trip each of said tripper means in response to engagement of said cam with the tripper means during movement of said carriage in its path of travel along said guideway thereby to actuate the tripped micro-switches, each of said micro-switches upon actuation controlling said carriage electric circuit in a manner to control the operation of said power driven means to stop the movement of said carriage opposite a selected tuyere at a position opposite the actuated micro-switch with said punch ram in alignment with the selected tuyeres.

8. A tuyere punching machine according to claim 7 having electrical interlock means connected with said puncher electric circuit and said carriage electric circuit operative to control said circuits and switches in a manner which permits movement of said carriage along said guideway only when said puncher ram is in normal retracted position.

9. A tuyere punching machine according to claim 7 including an elongate electrical conductor bar mounted along said platform, said micro-switches which are positioned opposite said tuyeres being mounted on said switch bar, a reversing micro-switch having a tripper means mounted on one end of said switch bar and a reversing micro-switch having a tripper means mounted on the other end of said switch bar for controlling said carriage electric circuit to stop the movement of said carriage and reverse its direction of travel, a reversing cam mounted on said carriage engageable with said reversing micro-switch tripper means means to actuate said reversing micro-switches when said carriage reaches either end of its path of travel along said guideway.

10. A tuyere punching machine according to claim 8 including an electrical conductor bar fixedly mounted along said platform, said micro-switches being adjustably mounted on said conductor bar, one for each tuyere, a reversing micro-switch having a trip lever to actuate it mounted at one end of said conductor bar and a reversing micro-switch having a trip lever to actuate it mounted at the other end of said conductor bar, a reversing cam mounted on said carriage engageable with said trip levers to actuate said reversing micro-switches, said reversing micro-switches controlling said carriage electric circuit to cause the direction of travel of said carriage to be changed to the opposite direction when said reversing cam engages a trip lever and trips it.

11. A tuyere punching machine according to claim 9 in which said power driven means for moving said carriage along said guideway comprises a reversible electric motor, a shaft mounted for rotation, a clutch-brake mechanism and speed reducer connecting said shaft and motor, a sprocket gear fixed on said shaft, an idler sprocket gear mounted for rotation, and a sprocket chain trained over said sprocket gears and secured to said carriage.

12. A tuyere punching machine according according to claim 1 in which a quick exhaust control valve is connected exhaust control valve is connected into said hydraulic circuit which is opened in response to actuation of certain of said switches upon the retraction stroke of said piston thereby permitting quick flow of the pressurized fluid from the space in said cylinder behind said piston during the retraction stroke.

13. A tuyere punching machine for punching the tuyeres of a converter having a row of tuyeres in a wall thereof through which air is blown beneath the surface of a molten bath contained in said converter which comprises a platform mounted alongside said row of tuyeres, a guideway mounted on said platform in parallel relation with said row of tuyeres, a travelling carriage movable along said guideway, an hydraulic cylinder supporting means mounted on said carriage, an hydraulic cylinder mounted on said supporting means, a reciprocable piston in said cylinder having a piston rod, a punch ram connected to said piston rod in alignment therewith, a stroke control rod secured at its forward end to said punch ram, guide means for said control rod mounted on said cylinder to cause said control rod to reciprocate with said puncher ram in a path of travel parallel with the long axis of said ram, tripper means secured to said control rod, electric limit switches mounted in spaced relation along said cylinder each having a trip-lever means in the path of travel of said tripper means to trip said trip-lever means and actuate said limit switches when said tripper means travels past said levers, an electric circuit connected with said limit switches, an hydraulic circuit connected with said hydraulic cylinder containing pressurized hydraulic fluid, control valves in said hydraulic circuit selectively operative in response to actuation of selected ones of said limit switches for controlling flow of the pressurized hydraulic fluid in said cylinder.

14. A tuyere punching machine according to claim 13 which includes a roller on the rear end portion of said control rod mounted for rotation, a roller track mounted longitudinally on said cylinder upon which said control rod roller travels, said limit switches being mounted in spaced relation along said roller track.

15. A tuyere punching machine according to claim 13 in which the guideway comprises a pair of tracks mounted on said platform, and said carriage comprises a frame table, wheels rotatably mounted on the frame table and rolling on said track; a trunnion support mounted on said frame table, a trunnion cradle, axially aligned stub shafts extending outwardly from said cradle supported by said trunnion support, means for angular adjustment of said cradle about the aligned axis of said stub shafts, and means for mounting said hydraulic cylinder on said trunnion cradle with the axis of said punch ram in alignment with a selected tuyere in said row of tuyeres.

16. A tuyere punching machine according to claim 13 in which the guideway comprises a pair of tracks mounted on said platform, and said carriage comprises a frame table, wheels rotatably mounted on frame table and rolling on said track; a trunnion support mounted on said frame table having a base portion and parallel upstanding trunnion supporting standards in spaced parallel relation, apertures in the upper portions of said standards, said apertures being aligned, said trunnion support having means for its angular adjustment on said frame table about its vertical axis, a trunnion cradle having a base portion and upstanding arms spaced in parallel relation, axially aligned stub shafts extending outwardly from the upper portions of said arms and into said aligned apertures in said standards, means for angular adjustment of said cradle about the aligned axis of said stub shafts, and means for mounting said hydraulic cylinder on said trunnion cradle with the axis of said punch ram in alignment with a selected tuyere in said row of tuyeres.

17. A tuyere punching machine according to claim 13 in which each tuyere in said row of tuyeres comprises a hollow tuyere body secured to said wall, said body having a hollow nose portion extending into said wall, an upwardly extending passageway within said body connected with a source of compressed air, flange portion at the outer end of said body portion having a central opening providing a valve seat at its rim portion, a valve within the hollow portion of said body normally resting upon said seat and closing said central opening and opening said central opening when removed for said seat, a floating seal having an opening therein aligned with said central opening and mounted on the outer surface of said flange portion; a removable outer flange secured to said first mentioned flange portion and maintaining said floating seal adjacent said flange portion, said outer flange central opening being aligned with said floating seal opening, said floating seal snugly fitting around such punch ram when said ram is reciprocated into and out of said tuyere body, and a tuyere pipe nipple extending from said hollow nose portion through said wall.

18. A tuyere punching machine according to claim 16 in which the inner end of the nose portion of said tuyere body has an inwardly extending annular shoulder and said tuyere pipe nipple is secured by a threaded connection to a removable ring resting against said shoulder, and which tuyere includes a removable sleeve means within said body maintaining said ring and nipple pipe in position, said outer flange being removable to permit access to the interior of said body for removal and replacement of said ring and tuyere pipe nipple.

References Cited
UNITED STATES PATENTS

| 1,034,995 | 8/1912 | Gannon | 266—41 |
| 1,292,162 | 1/1919 | Amburgh | 266—41 |

FOREIGN PATENTS

| 137,147 | 5/1950 | Australia. |

WILLIAM J. STEPHENSON, *Primary Examiner.*

EUGENE MAR, *Assistant Examiner.*